(12) United States Patent
Murray et al.

(10) Patent No.: US 8,060,663 B2
(45) Date of Patent: Nov. 15, 2011

(54) PHYSICAL LAYER INTERFACE FOR COMPUTING DEVICES

(75) Inventors: Brian P. Murray, Dublin (IE); Luis de la Torre Vega, Madrid (ES)

(73) Assignee: LSI Corporation, Milpitas, CA (US)

( * ) Notice: Subject to any disclaimer, the term of this patent is extended or adjusted under 35 U.S.C. 154(b) by 181 days.

(21) Appl. No.: 12/512,258

(22) Filed: Jul. 30, 2009

(65) Prior Publication Data

US 2011/0029701 A1 Feb. 3, 2011

(51) Int. Cl.
G06F 3/00 (2006.01)
G06F 13/00 (2006.01)
(52) U.S. Cl. .................. 710/8; 710/5; 710/15; 710/33
(58) Field of Classification Search ............... None
See application file for complete search history.

(56) References Cited

U.S. PATENT DOCUMENTS

| | | | |
|---|---|---|---|
| 2003/0208652 A1* | 11/2003 | Kuhlmann et al. | 710/305 |
| 2005/0066033 A1* | 3/2005 | Cheston et al. | 709/225 |
| 2007/0066359 A1* | 3/2007 | Zhuang | 455/557 |

OTHER PUBLICATIONS

Yoshimura, Tsutomu, a 10GBbase Ethernet Transceiver (LAN PHY), 2002 IEEE, ieeexplore.org [online, accessed on Mar. 24, 2011], URL: http://ieeexplore.ieee.org/stamp/stamp.jsp?tp=&arnumber=1012840.*

* cited by examiner

Primary Examiner — Tariq Hafiz
Assistant Examiner — Scott Sun
(74) Attorney, Agent, or Firm — Otterstedt, Ellenbogen & Kammer, LLP

(57) ABSTRACT

A physical layer device for interfacing with multiple computing devices includes a digital core and first and second analog front ends. The digital core is operative to perform one or more functions of the physical layer device. Each of the first and second analog front ends is operative to perform signal conversion between a digital domain and an analog domain. The physical layer device further includes a digital switching circuit coupled to the digital core and to the first and second analog front ends. The digital switching circuit is operative to electrically connect the digital core to the first analog front end or the second analog front end as a function of a control signal applied to the digital switching circuit.

20 Claims, 3 Drawing Sheets

100

300

PHYSICAL LAYER INTERFACE FOR COMPUTING DEVICES

FIELD OF THE INVENTION

The present invention relates generally to the electrical, electronic, and computer arts, and more particularly relates to computer network interfacing.

BACKGROUND OF THE INVENTION

In modern computer networking applications, particularly those involving portable computing devices, a gigabit Ethernet (GE) port (e.g., RJ-45 connector) is typically provided on a portable computer (e.g., laptop computer, etc.), for portable use, and on a docking station adapted to receive the portable computer, for desktop/home base use. In order to provide a network connection to the portable computer when used in both docked and undocked states from a single GE physical layer (PHY) port, an analog local area network (LAN) switch is typically employed. In this arrangement, one side of the LAN switch is connected to an analog output of the GE PHY port. The other side of the LAN switch provides two sets of analog output pins (e.g., media dependent interface (MDI) pins) for connection to the GE port connectors (e.g., RJ-45) associated with the portable computer and the docking station, respectively. Although two separate GE PHY ports can be alternatively utilized, such approach would be significantly more expensive and thus undesirable.

The use of an analog LAN switch to provide multiple GE port connections has a number of disadvantages that become exacerbated as integrated circuit (IC) process technology scales to smaller geometries and lower voltages. Specifically, the LAN switch adds significant resistance and capacitance to a network signal path (e.g., typically about 8 to 12 ohms per pair of MDI pins). This results in substantial attenuation of a signal conveyed through the signal path from the pins of the single PHY port to the GE port connectors. This problem is particularly difficult for the docking station GE port connector as there are, by necessity, long printed circuit board (PCB) traces used for conveying networking signals, and other signals, as they are routed through the docking station connector.

With each advance in IC process technology, transistors sizes shrink and operating voltages decrease. This results in significant savings in both IC area and overall power consumption, thereby resulting in lower cost. However, with smaller transistors it also becomes more difficult to generate high input/output (I/O) voltages often required for many standard networking protocols. I/O voltages have dropped from about 5 volts to about 3.3 volts, and are now trending towards 2.5 volts and lower. For instance, 10Base-T MDI signal levels are typically about 2.5 volts.

IC integration is heavily driven by process technology migration, which allows a far greater number of digital gates to be integrated at a very low cost. However, to take full advantage of process advances, analog IO functions must also be integrated (e.g., GE PHY function). The use of an analog LAN switch for providing dual GE port connectivity, and the additional parasitic impedances introduced by the analog LAN switch, make it more difficult to take full advantage of process technology migration and corresponding cost savings.

SUMMARY OF THE INVENTION

Illustrative embodiments of the present invention provide techniques for reducing cost and power overall consumption in a PHY interface device. Aspects of the invention advantageously allow simpler process migration of a GE PHY device while meeting Institute of Electrical and Electronics Engineers (IEEE) computer networking standards necessary for customer adoption. Embodiments of the invention advantageously provide an integrated multiple-port PHY device adapted to directly interface with multiple corresponding computing devices. By providing a direct connection between the PHY application specific integrated circuit (ASIC) and network connectors associated with, for example, a laptop computer and a computer docking station, enhanced performance (e.g., reliability, speed, signal integrity) can be achieved while beneficially reducing power consumption and cost.

In accordance with one aspect of the invention, a physical layer device for interfacing with multiple computing devices includes a digital core and at least first and second analog front ends. The digital core is operative to perform one or more functions of the physical layer device. Each of the first and second analog front ends is operative to perform signal conversion between a digital domain and an analog domain. The physical layer device further includes a digital switching circuit coupled to the digital core and to the first and second analog front ends. The digital switching circuit is operative to electrically connect the digital core to the first analog front end or the second analog front end as a function of a control signal applied to the digital switching circuit.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate similar elements throughout the several views of the drawings, and wherein.

It is to be appreciated that elements in the figures are illustrated for simplicity and clarity and have not necessarily been drawn to scale. Moreover, common but well-understood elements that may be useful or necessary in a commercially feasible embodiment may not be shown in order to facilitate a less obstructed view of the illustrated embodiments.

DETAILED DESCRIPTION OF THE INVENTION

The present invention will be described herein in the context of illustrative circuits and methods for providing multiple GE PHY port connections in a computer networking application. It is to be appreciated, however, that the techniques of the present invention are not limited to the specific methods and circuits shown and described herein. Rather, embodiments of the invention are directed broadly to techniques for beneficially reducing power consumption and costs associated with a computer network interface. For this reason, numerous modifications can be made to these embodiments and the results will still be within the scope of the invention. No limitations with respect to the specific embodiments described herein are intended or should be inferred.

Aspects of the present invention advantageously provide an integrated multiple-port PHY device adapted to directly interface with multiple corresponding computing devices while achieving enhanced performance (e.g., reliability, speed, signal integrity) while reducing power consumption and cost. Although embodiments of the invention are described herein in the context of a GE communication protocol, it is to be understood that the techniques of the present invention may be employed with other standard communication protocols or non-standard protocols, as will become apparent to those skilled in the art given the teachings herein.

Figure 1:
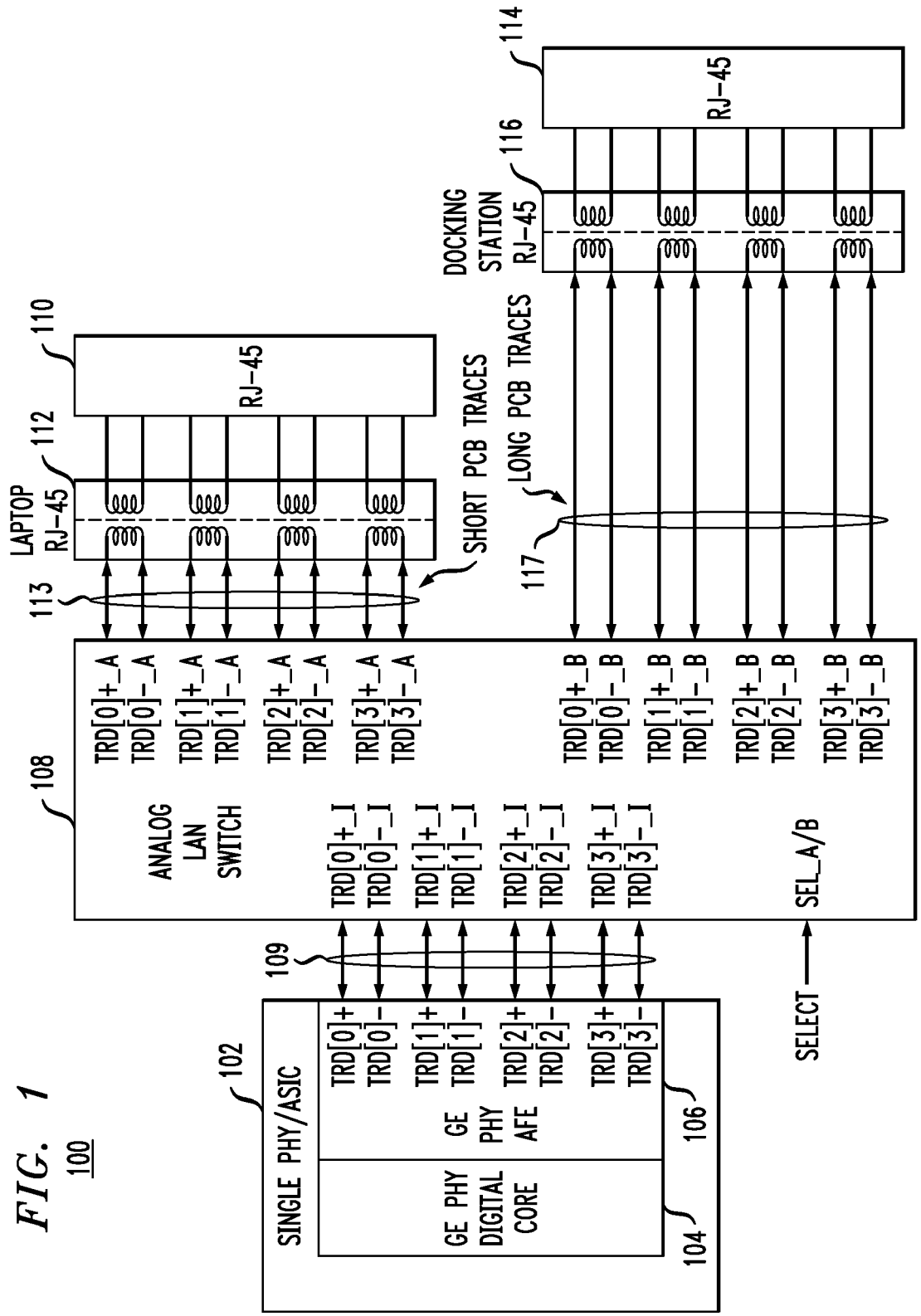
FIG. 1 is a schematic diagram depicting an illustrative PHY interface circuit for connecting two GE port connectors to a single GE PHY device.

FIG. 1 is a schematic diagram depicting an illustrative PHY interface circuit 100 for connecting two GE port connectors to a single GE PHY device. Interface circuit 100 comprises a single PHY device 102 including a GE PHY digital core 104 operatively coupled to a GE PHY analog front end (AFE) 106. The PHY digital core 104 preferably comprises pure digital circuitry and is operative to perform core logic functions of the GE PHY device 102. The AFE 106 preferably comprises pure analog and mixed digital and analog circuitry and is responsible for several tasks. These tasks include, but are not limited to, signal capture, analog domain filtering and handoffs to an analog-to-digital converter (ADC) in a first (e.g., receive) direction, and signal conversion from a digital domain to the analog domain by using a digital-to-analog converter (DAC), analog filtering and power amplification in a second (e.g., transmit) direction.

A plurality of I/O connections is provided for interfacing the GE PHY device 102 with external circuitry. Four differential I/O connections are shown, namely, TRD[0]+ and TRD[0]−, TRD[1]+ and TRD[1]−, TRD[2]+ and TRD[2]−, and TRD[3]+ and TRD[3]−, with each "+" (e.g., non-inverting) and "−" (e.g., inverting) signal pair corresponding to a given differential signal connection. Although only four pairs of I/O connections are shown, it is to be understood that the invention is not limited to any specific number of I/O connections. Moreover, the invention is not limited to differential I/O connections, but may comprise single-ended I/O connections or a combination of single-ended and differential I/O connections, as will be understood by those skilled in the art.

PHY interface circuit 100 further comprises an analog LAN switch 108 coupled to the PHY device 102 at a first side. Specifically, the LAN switch 108 is preferably provided with a first plurality of I/O connections, namely, TRD[0]+_I, TRD[0]−_I, TRD[1]+_I, TRD[1]−_I, TRD[2]+_I, TRD[2]−_I, TRD[3]+_I, and TRD[3]−_I, each connection being coupled to a corresponding I/O connection on the PHY device 102 via respective conductive traces (e.g., PCB traces), or an alternative connection means, referred to collectively as 109. At a second side, the LAN switch 108 is provided with a second plurality of I/O connections, namely, TRD[0]+_A, TRD[0]−_A, TRD[1]+_A, TRD[1]−_A, TRD[2]+_A, TRD[2]−_A, TRD[3]+_A, and TRD[3]−_A, adapted for connection to corresponding pins of a first network port connector 110, which may be a laptop computer RJ-45 connector, via a first isolation circuit 112. The LAN switch 108, at the second side, is preferably provided with a third plurality of I/O connections, namely, TRD[0]+_B, TRD[0]−_B, TRD[1]+_B, TRD[1]−_B, TRD[2]+_B, TRD[2]−_B, TRD[3]+_B, and TRD[3]−_B, adapted for connection to corresponding pins on a second network port connector 114, which may be a docking station RJ-45 connector, via a second isolation circuit 116. Each of the second and third plurality of I/O connections essentially forms a PHY port of a computing device to which it corresponds, although only one port is active at any given time. While two groups (e.g., group "A" and group "B") of I/O connections are provided on the second side of the analog LAN switch 108, it is to be understood that the invention not limited to any specific number of groups of I/O connections which can be supported.

The analog LAN switch 108 includes a control input, SEL_A/B, adapted to receive a control signal, SELECT, applied thereto. The LAN switch 108 is preferably operative to select either the I/O connections of the second plurality of I/O connections (e.g., group A) or the I/O connections of the third plurality of I/O connections (e.g., group B) for electrical connection to corresponding I/O connections in the first plurality of I/O connections as a function of the control signal applied to the control input SEL_A/B. The LAN switch thus functions in a manner consistent with an analog multiplexer.

More particularly, when the control signal SELECT applied to the control input SEL_A/B of the analog LAN switch 108 is at a first logic level, which may be a logic "1" (e.g., VDD), I/O connections TRD[0]+_I and TRD[0]−_I are electrically connected to TRD[0]+_A and TRD[0]−_A, respectively, TRD[1]+_I and TRD[1]−_I are electrically connected to TRD[1]+_A and TRD[1]−_A, respectively, TRD[2]+_I and TRD[2]−_I are electrically connected to TRD[2]+_A and TRD[2]−_A, respectively, and TRD[3]+_I and TRD[3]−_I are electrically connected to TRD[3]+_A and TRD[3]−_A, respectively. Similarly, when the SELECT signal applied to the SEL_A/B control input of the analog LAN switch 108 is at a second logic level, which may be a logic "0" (e.g., ground or zero volts), I/O connections TRD[0]+_I and TRD[0]−_I are electrically connected to TRD[0]+_B and TRD[0]−_B, respectively, TRD[1]+_I and TRD[1]−_I are electrically connected to TRD[1]+_B and TRD[1]−_B, respectively, TRD[2]+_I and TRD[2]−_I are electrically connected to TRD[2]+_B and TRD[2]−_B, respectively, and TRD[3]+_I and TRD[3]−_I are electrically connected to TRD[3]+_B and TRD[3]−_B, respectively.

The first and second isolation circuits 112 and 116, respectively, preferably comprise a transformer, or an alternative circuit element (e.g., capacitor, optical coupler, etc.), operative to electrically isolate the respective network port connectors 110 and 114 from the analog LAN switch 108 by generating an electrical signal on one side of a given isolation circuit which is indicative of a corresponding electrical signal applied to the other side of the isolation circuit without any current to flow between the two sides. In this manner, the isolation circuit prevents high voltage and/or current spikes present at the network port connectors 110 and 114 (e.g., from electrostatic discharge (ESD) events, lightning, etc.) from damaging sensitive circuit elements coupled to the network port connectors.

The first isolation circuit 112 is preferably connected to the analog LAN switch 108 via a plurality of corresponding conductive traces (e.g., PCB traces), referred to collectively as 113. Likewise, the second isolation circuit 116 is connected to the analog LAN switch 108 via a plurality of corresponding conductive traces (e.g., PCB traces), referred to collectively as 117. As apparent from the figure, the conductive traces 113 used to connect the first isolation circuit 112 to the LAN switch 108 are relatively short in length compared to the conductive traces 117 used to connect the second isolation circuit 116 to the analog LAN switch which, in a computer docking station application, must be routed to a docked computing device through the docking station connector. Additionally, the analog LAN switch 108 adds significant parasitic impedances (e.g., resistance and capacitance) to the signal path. The combined effect is to significantly increase signal attenuation in the signal paths between the PHY device 102 and the respective network port connectors 110 and 114, which is undesirable.

Figure 2:
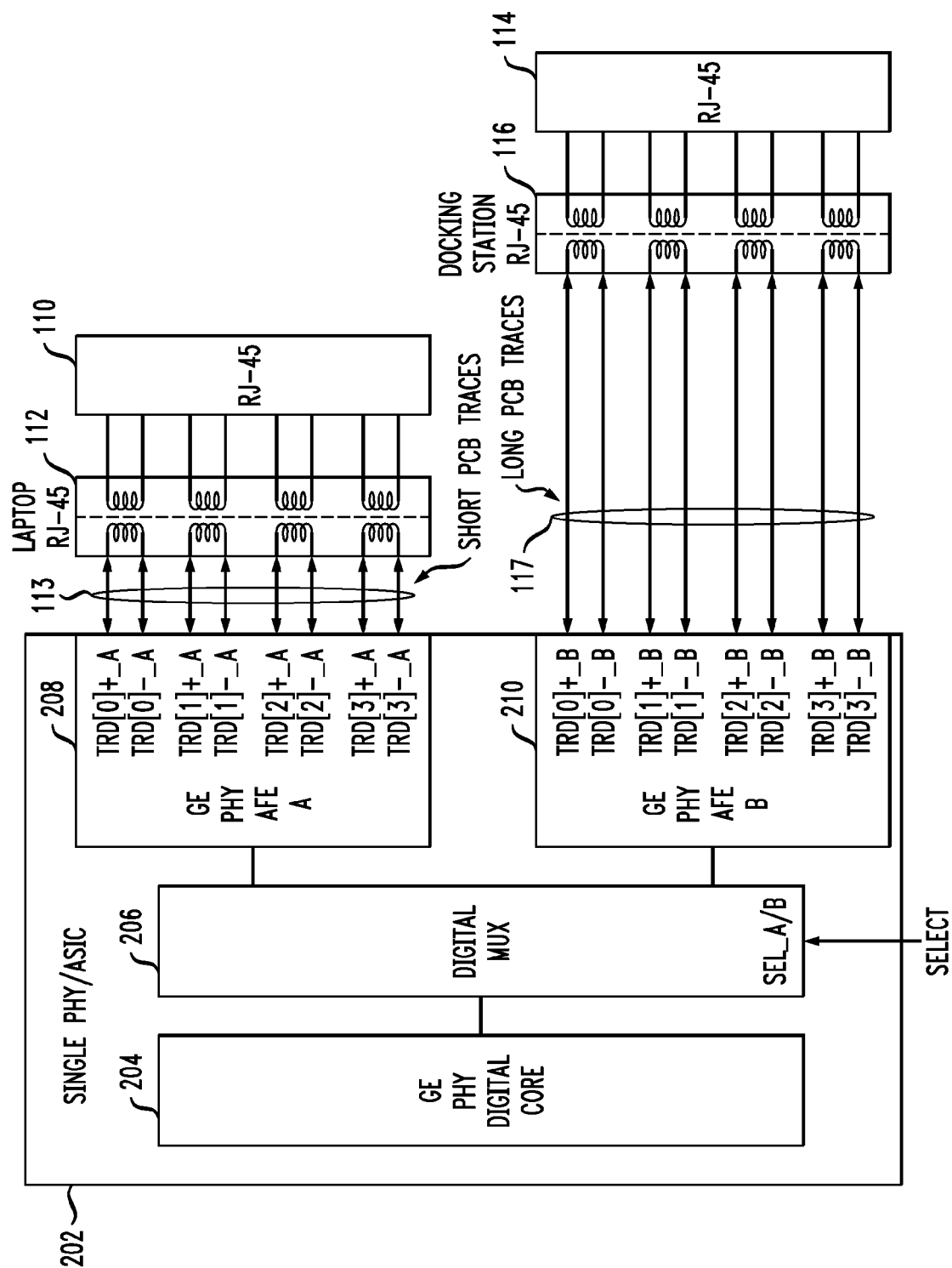
FIG. 2 is a schematic diagram depicting at least a portion of an exemplary PHY interface circuit for connecting multiple GE port connectors to a GE PHY device, according to an embodiment of the present invention.

FIG. 2 is a schematic diagram depicting an exemplary PHY interface circuit 200 for connecting multiple GE port connectors to a single GE PHY device, according to an embodiment of the present invention. Unlike the interface circuit 100 shown in FIG. 1, interface circuit 200 eliminates the need for an external analog LAN switch by integrating a multiplexer into the PHY port IC. More particularly, the interface circuit 200 preferably comprises a single-port, dual-interface PHY device 202 including a GE PHY digital core 204 operatively coupled to first and second GE PHY AFEs, 208 and 210, respectively, via a multiplexer 206, or alternative switching circuitry. Here, multiplexer 206 is a digital multiplexer, which has an advantage of being able to be integrated on-chip at a substantially lower cost compared to the external analog LAN switch 108 shown in FIG. 1. Although described herein in the context of a GE network protocol, techniques of the invention may be used for providing multiple network interface connections from a single PHY device employing alternative standard and/or non-standard communication protocols (e.g., 10 GE, 10 Base-T, 100 Base-T, 1000 Base-T, etc.).

The term "digital core," which may be used synonymously with "logic core" or "digital logic core," as used herein is intended to broadly refer to a combination of one or more functional circuits or circuit elements operative to process signals having discrete digital voltage levels, such as, but not limited to, programmable logic circuitry, a microprocessor, or a finite state machine, among other functional circuits. In an ASIC application, for example, a digital core may comprise synthesizable circuits for systems-on-chip (SOC) designs, microprocessors, microcontrollers, serial communication controllers, etc., generally designed using a circuit description language, such as, for example, very high speed integrated circuit (VHSIC) hardware description language (VHDL) or Verilog, as will be known by those skilled in the art.

The PHY digital core 204 preferably comprises purely digital circuitry and is operative to perform one or more core logic functions of the GE PHY device. For example, the PHY digital core 204 may include signal processing circuitry adapted to perform echo cancellation, timing recovery, equalization, baseline wander correction, slicing, error detection and correction, error decoding, and encoding/decoding of a parallel digital interface into complex multi-dimensional pulse amplitude modulated (PAM) signals for conversion to and from analog signals for transmission/reception over copper cable (e.g., 100 meters in length), or an alternative transmission medium. In other embodiments, the PHY digital core 204 may include a serializer/deserializer (SerDes) operative to serialize multi-bit parallel data paths into one serial data stream for serial optics or physical media dependent (PMD) interfaces at transmitters, and/or to de-serialize one serial data stream into multi-bit parallel data paths at receivers.

Each of the first and second AFEs 208 and 210, respectively, preferably comprises purely analog and mixed digital and analog circuitry and is operative to perform, among other functions, analog signal capture, analog filtering and handoffs to an ADC in a first (e.g., receive) mode. AFEs 208 and 210 are further operative to perform signal conversion from a digital domain to an analog domain using, for example, a DAC, analog filtering and power amplification in a second (e.g., transmit) mode. In a full-duplex 1000 Base-T communication standard, parallel signal paths are preferably provided in the first and/or second AFEs 208, 210 for transmitting and receiving simultaneously. Thus, the AFEs 208, 210 may be operative in the first and second modes concurrently.

The first and/or second AFE 208, 210 may be implemented in a manner consistent with the AFE 106 depicted in FIG. 1, although the first and second AFEs may alternatively be implemented in a different manner. Furthermore, the first and second AFEs 208, 210 need not be identical to one another. Although the PHY device 202 is shown having two AFEs, it is to be appreciated that the invention is not limited to any specific number of AFEs. For example, in an alternative embodiment, the PHY device 202 may comprise four AFEs, each capable of directly interfacing with its own corresponding external device or circuit. In this alternative embodiment, the PHY device 202 may be considered a single-port, quad-interface PHY device.

The multiplexer 206 includes a control input, SEL_A/B, adapted to receive a control signal, SELECT, applied thereto. The multiplexer 206 is coupled to the PHY core 204 via a first connection. The multiplexer 206 is also coupled to the first AFEs 208 via a second connection and is coupled to the second AFE 210 via a third connection. Each of the first, second and third connections can include multiple conductors, or alternative signal paths, and may therefore be considered a bus. The first, second and third connections preferably have the same number of conductors (e.g., 8) relative to one another, although the invention is not limited to any specific number of conductors in a given connection. Preferably, the number of conductors in a given one of the first, second and third connections corresponds to the number of I/O connections supported by the respective AFEs 208 and 210. The multiplexer 206 is preferably operative to electrically connect the first connection to one of the second or third connections as a function of the control signal SELECT applied to the control input SEL_A/B.

More particularly, by way of example only, when the SELECT signal applied to the control input SEL_A/B of the multiplexer 206 is at a first logic level, which may be a logic "1," the PHY digital core 204 is connected to the first AFE 208. Similarly, when the SELECT signal applied to the SEL_A/B input of the multiplexer 206 is at a second logic level, which may be a logic "0," the PHY digital core 204 is connected to the second AFE 210. The SELECT control signal may optionally be used to power down the unused AFE to thereby reduce power consumption in the PHY interface circuit 200. When PHY device 202 includes more than two AFEs, more than one control signal may be required. For example, although not explicitly shown, the multiplexer 206 may include two control inputs adapted to receive two control signals for selecting one of up to four AFEs in the PHY device 202, as will become apparent to those skilled in the art. In this instance, the control signals may be optionally decoded to power-down the unused AFEs.

Each AFE in the PHY device 202 is adapted for connection to a corresponding network port connector. Specifically, the first AFE 208 is preferably provided with a plurality of I/O connections, namely, TRD[0]+_A, TRD[0]−_A, TRD[1]+_A, TRD[1]−_A, TRD[2]+_A, TRD[2]−_A, TRD[3]+_A, and TRD[3]−_A, adapted for connection to corresponding pins of first network port connector 110, which may be a laptop computer RJ-45 connector, via first isolation circuit 112. Similarly, the second AFE 210 is preferably provided with a plurality of I/O connections, namely, TRD[0]+_B, TRD[0]−_B, TRD[1]+_B, TRD[1]−_B, TRD[2]+_B, TRD[2]−_B, TRD[3]+_B, and TRD[3]−_B, adapted for connection to corresponding pins on second network port connector 114, which may be a docking station RJ-45 connector, via second isolation circuit 116. Each of the I/O connections, which may be, for example, MDI pins, associated with the AFEs 208 and 210 essentially forms a PHY port, although only one port is active at any given time. While two groups (e.g., group "A" and group "B") of I/O connections are provided between the PHY device 202 and the corresponding network port connectors 110 and 114, it is to be understood that the invention not limited to any specific number of groups of I/O connections.

At least one of the first and second isolation circuits 112 and 116, respectively, preferably comprises a transformer, or an alternative circuit element (e.g., optical coupler), operative to electrically isolate the respective network port connectors 110 and 114 from a corresponding AFE 208 and 210, respectively, by generating an electrical signal on one side of the isolation circuit which is indicative of a corresponding electrical signal applied to the other side of the isolation circuit essentially without any current flowing between the two sides. It is not required that both isolation circuits 112 and 116 be identical to one another. The first isolation circuit 112 is preferably connected to the first AFE 208 via first set of corresponding conductive traces 113 (e.g., PCB traces), or alternative routing. Likewise, the second isolation circuit 116 is connected to the second AFE 210 via second set of conductive traces 117 (e.g., PCB traces), or alternative routing. As previously stated, the second set of conductive traces 117 connecting the second AFE 210 to the second isolation circuit 116 used for the computer docking station will generally be of greater length compared to the first set of conductive traces 113 connecting the first AFE 208 to the first isolation circuit 112 used for the laptop computer.

In other embodiments of the invention, the first and second network port connectors 110 and 114, respectively, can be connected directly to corresponding AFEs 208, 210. In this circuit configuration, which may be considered a direct couple arrangement, the first and second isolation circuits 112 and 116 may be eliminated.

Since the multiplexer 206 is coupled between the PHY digital logic core 204 and the first and second AFEs 208 and 210, respectively, prior to digital-to-analog conversion and thus conveys only digital signals (i.e., digital domain), the multiplexer can be implemented using a digital multiplexer, as previously stated. By performing the multiplexing function in a purely digital domain, as opposed to in the analog domain using an external analog LAN switch 108, as in the PHY interface circuit 100 shown in FIG. 1, the PHY interface circuit 200 will be substantially less susceptible to parasitic impedances (e.g., resistances and capacitances) introduced into the signal paths by an analog multiplexer.

The digital multiplexer 206 essentially adds no noticeable impairment or loss in performance with regard to the GE signals conveyed by the PHY interface circuit 200. By contrast, an analog multiplexer (e.g., analog LAN switch 108 shown in FIG. 1), even of the highest quality, generally adds significant capacitance and other loading to the signals, thereby reducing performance and noise margin over IEEE specifications. Multiplexing analog signals can be complex depending on their voltage levels, impedance, robustness to electrostatic discharge (ESD) events, noise immunity, etc. Hence, another advantage achieved by using a digital multiplexer in the stated manner is a reduction in design complexity.

In the illustrative context of GE signals, analog multiplexing requires relatively high voltage devices (e.g., input/output drivers capable of driving 2.8 volts or higher) having a relatively large area (e.g., 1000's μm or larger) and robust ESD protection associated therewith. These devices within the analog multiplexer can significantly degrade analog signals passing through the analog multiplexer in either direction. In some cases, such reduced performance attributable to the use of an analog multiplexer can result in critical device failure. Moreover, because the multiplexer 206 is incorporated on the same IC as the PHY core 204 and AFEs 208 and 210, the lengths of signal paths (e.g., including PCB traces, external circuit elements, pins, etc.) between the AFEs and corresponding external network port connectors 110 and 114 can be beneficially minimized, thereby further enhancing performance.

By duplicating the analog portion of the PHY device 202, namely, the analog front end, there is essentially no degradation of the analog signals. Although this solution may slightly increase the cost of the PHY device, the added cost is more than compensated by the elimination of the analog multiplexer. Further, even assuming the cost of providing an additional analog front end on the PHY device IC was equivalent to the cost of the analog multiplexer, the performance benefits alone achieved using the approach according to embodiments of the present invention far outweigh the performance of other circuit arrangements which do not employ techniques of the invention.

At least a portion of the techniques of the present invention may be implemented in one or more integrated circuits. In forming integrated circuits, die are typically fabricated in a repeated pattern on a surface of a semiconductor wafer. Individual die are cut or diced from the wafer, then packaged as integrated circuits. In packaging the dies, individual die are attached to a receiving substrate according to methods of the invention. One skilled in the art would know how to dice wafers to produce integrated circuits. Integrated circuits so manufactured are considered part of this invention.

An integrated circuit formed in accordance with techniques of the present invention can be employed in essentially any application and/or electronic system. Suitable systems for implementing the invention may include, but are not limited to, personal computers, network multimedia devices, network communications devices, etc. Systems incorporating such integrated circuits are considered part of this invention. Given the teachings of the invention provided herein, one of ordinary skill in the art will be able to contemplate other implementations and applications of the techniques of the invention.

Figure 3:
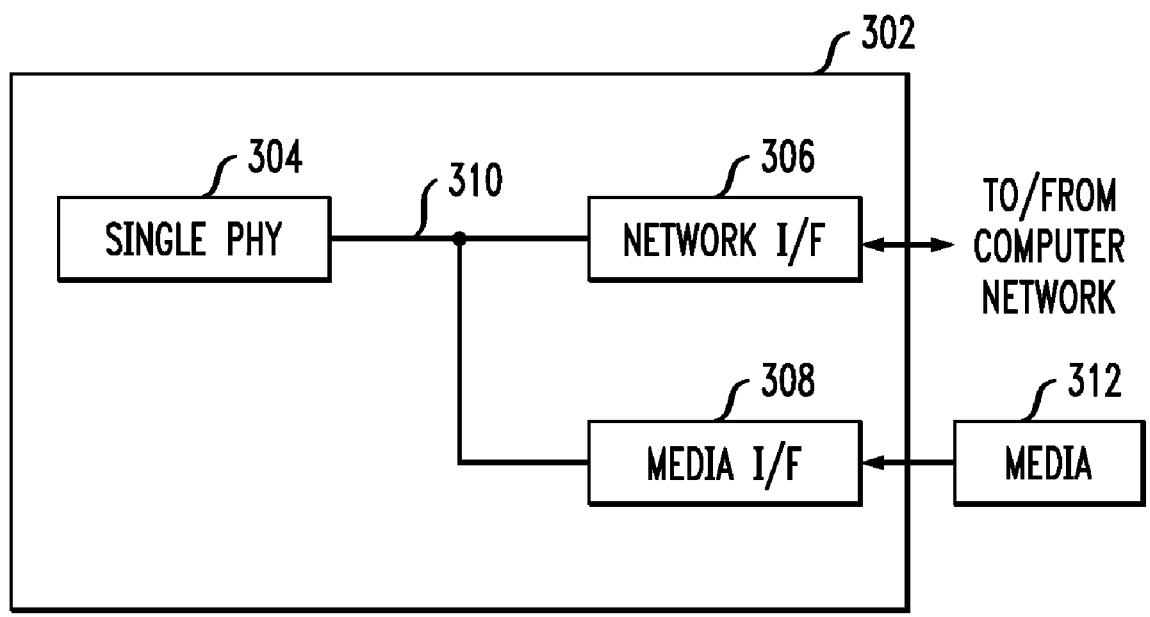
FIG. 3 is a functional block diagram depicting at least a portion of an exemplary electronic system, according to an embodiment of the present invention.

By way of illustration only, with reference to FIG. 3, at least a portion of an exemplary electronic system 300 is shown including an IC 302 comprising at least one single PHY device/port 304 and one or more input/output interfaces (I/F) coupled to the PHY device via a bus 310, or alternative connection means. The phrase "input/output interface," as used herein, is intended to include, for example, one or more mechanisms for inputting data to the PHY device 304, and/or one or more mechanisms for providing data from the PHY device. As shown, illustrative input/output interfaces suitable for use in the system 300 include, but are not limited to, a network interface 306 (e.g., a network interface card (NIC), etc.) and a media interface 308 (e.g., memory controller, CD_ROM drive, etc.). Network interface 306 may be operative to facilitate the transfer of data between the PHY device 304 and a computer network. Likewise, media interface 308 may be operative to transfer data between media 312, or an alternative content storage device.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A physical layer device for interfacing with multiple computing devices, the physical layer device comprising:
a digital core operative to perform one or more functions of the physical layer device;
a first analog front end and at least a second analog front end, each of the first and second analog front ends being operative to perform signal conversion between a digital domain and an analog domain; and
a digital switching circuit coupled to the digital core and to the first and second analog front ends, the digital switching circuit being operative to electrically connect the digital core to one of the first analog front end and the second analog front end as a function of a control signal applied to the digital switching circuit.

2. The physical layer device of claim 1, wherein the digital switching circuit comprises a digital multiplexer having a first input/output connection coupled to the digital core, a second input/output connection coupled to the first analog front end, at least a third input/output connection coupled to the second analog front end, and at least one control input adapted to receive the control signal.

3. The physical layer device of claim 1, wherein at least one of the first and second analog front ends is operative to communicate with a corresponding computing device using a gigabit Ethernet protocol.

4. The physical layer device of claim 1, wherein the digital core comprises a serializer/deserializer operative in at least one of a first mode to convert a plurality of multiple-bit parallel data paths into a serial data stream, and a second mode to convert a serial data stream into a plurality of multiple-bit parallel data paths.

5. The physical layer device of claim 4, wherein the first mode is a transmit mode and the second mode is a receive mode.

6. The physical layer device of claim 4, wherein the serializer/deserializer is simultaneously operative in the first and second modes.

7. The physical layer device of claim 1, wherein the digital core comprises signal processing circuitry operative to perform at least one of echo cancellation, timing recovery, equalization, baseline wander correction, slicing, error detection, error correction, and data encoding and decoding.

8. The physical layer device of claim 1, further comprising at least a third analog front end coupled to the digital switching circuit, the digital switching circuit being operative to electrically connect the digital core to one of the first analog front end, the second analog front end and the third analog front end as a function of the control signal.

9. A physical layer interface circuit for providing communication between a plurality of computing devices and a data network, the interface circuit comprising:
at least one physical layer device comprising:
a digital core operative to perform one or more functions of the physical layer device;
a first analog front end and at least a second analog front end, each of the first and second analog front ends being operative to perform signal conversion between a digital domain and an analog domain; and
a digital switching circuit coupled to the digital core and to the first and second analog front ends, the digital switching circuit being operative to electrically connect the digital core to one of the first analog front end and the second analog front end as a function of a control signal applied to the digital switching circuit; and
at least first and second network port connectors operatively coupled to the physical layer device, each of the first and second network port connectors being adapted for connecting a corresponding computing device to the physical layer device.

10. The interface circuit of claim 9, further comprising first and second isolation circuits, the first isolation circuit being connected between the first analog front end and the first network port connector, the second isolation circuit being connected between the second analog front end and the second network port connector.

11. The interface circuit of claim 10, wherein at least one of the first and second isolation circuits comprises at least one a transformer and a capacitive element.

12. The interface circuit of claim 10, wherein at least one of the first and second isolation circuits comprises an optical coupler.

13. The interface circuit of claim 9, wherein at least one of the first and second network port connectors comprises an RJ-45 connector.

14. The interface circuit of claim 9, wherein at least one of the first and second analog front ends is operative to communicate with the corresponding computing device using a gigabit Ethernet protocol.

15. The interface circuit of claim 9, wherein the digital switching circuit comprises a digital multiplexer having a first input/output connection coupled to the digital core, a second input/output connection coupled to the first analog front end, at least a third input/output connection coupled to the second analog front end, and at least one control input adapted to receive the control signal.

16. The interface circuit of claim 9, wherein the at least one physical layer device further comprises at least a third analog front end coupled to the digital switching circuit, the digital switching circuit being operative to electrically connect the digital core to one of the first analog front end, the second analog front end and the third analog front end as a function of the control signal.

17. The interface circuit of claim 9, wherein the digital core comprises signal processing circuitry operative to perform at least one of echo cancellation, timing recovery, equalization, baseline wander correction, slicing, error detection, error correction, and data encoding and decoding.

18. An integrated circuit including at least one physical layer device for interfacing with multiple computing devices, the at least one physical layer device comprising:
a digital core operative to perform one or more functions of the physical layer device;
a first analog front end and at least a second analog front end, each of the first and second analog front ends being operative to perform signal conversion between a digital domain and an analog domain; and
a digital switching circuit coupled to the digital core and to the first and second analog front ends, the digital switching circuit being operative to electrically connect the digital core to one of the first analog front end and the second analog front end as a function of a control signal applied to the digital switching circuit.

19. An integrated circuit including at least one physical layer interface circuit for providing communication between a plurality of computing devices and a data network, the at least one physical layer interface circuit comprising:

at least one physical layer device comprising:
- a digital core operative to perform one or more functions of the physical layer device;
- a first analog front end and at least a second analog front end, each of the first and second analog front ends being operative to perform signal conversion between a digital domain and an analog domain; and
- a digital switching circuit coupled to the digital core and to the first and second analog front ends, the digital switching circuit being operative to electrically connect the digital core to one of the first analog front end and the second analog front end as a function of a control signal applied to the digital switching circuit; and at least first and second network port connectors operatively coupled to the physical layer device, each of the first and second network port connectors being adapted for connecting a corresponding computing device to the physical layer device.

20. An electronic system, comprising:

at least one integrated circuit including at least one physical layer device for interfacing with multiple computing devices, the at least one physical layer device comprising:
- a digital core operative to perform one or more functions of the physical layer device;
- a first analog front end and at least a second analog front end, each of the first and second analog front ends being operative to perform signal conversion between a digital domain and an analog domain; and
- a digital switching circuit coupled to the digital core and to the first and second analog front ends, the digital switching circuit being operative to electrically connect the digital core to one of the first analog front end and the second analog front end as a function of a control signal applied to the digital switching circuit.

* * * * *